Jan. 6, 1925.  
H. SOUR  
VALVE  
Filed Feb. 8, 1924

WITNESSES

INVENTOR  
Henry Sour,  
BY  
ATTORNEYS

Jan. 6, 1925.

H. SOUR 1,521,724

VALVE

Filed Feb. 8, 1924

WITNESSES

INVENTOR

Henry Sour,

BY

ATTORNEYS

Patented Jan. 6, 1925.

1,521,724

UNITED STATES PATENT OFFICE.

HENRY SOUR, OF SHREVEPORT, LOUISIANA.

VALVE.

Application filed February 8, 1924. Serial No. 691,407.

*To all whom it may concern:*

Be it known that I, HENRY SOUR, a citizen of the United States, and resident of Shreveport, in the parish of Caddo, in the State of Louisiana, have invented certain new and useful Improvements in Valves, of which the following is a specification.

This invention relates to gate valves especially adapted for use in water mains and the like.

Briefly stated an important object of this invention is to provide a water main valve having oppositely located valves adapted to cooperate with seats at opposite ends of the valve so as to positively stop the flow of water.

A further object of the invention is to provide a valve wherein the pressure of the water assists the opening of the valve.

Also an important aim of this invention is to provide a valve of the character specified having novel means whereby the accumulation of sand and other solid particles are maintained at a low point, and the valve is provided with means whereby the same may be cleaned out periodically without shutting off the flow of water.

A further object is to provide a valve which is of highly simplified construction, durable in use and cheap to manufacture.

Other objects and advantages will be apparent during the course of the following description.

In the accompanying drawing forming a part of this application, and in which like numerals are employed to designate like parts throughout the same, Figure 1 is a vertical sectional view through the valve.

Figure 1:
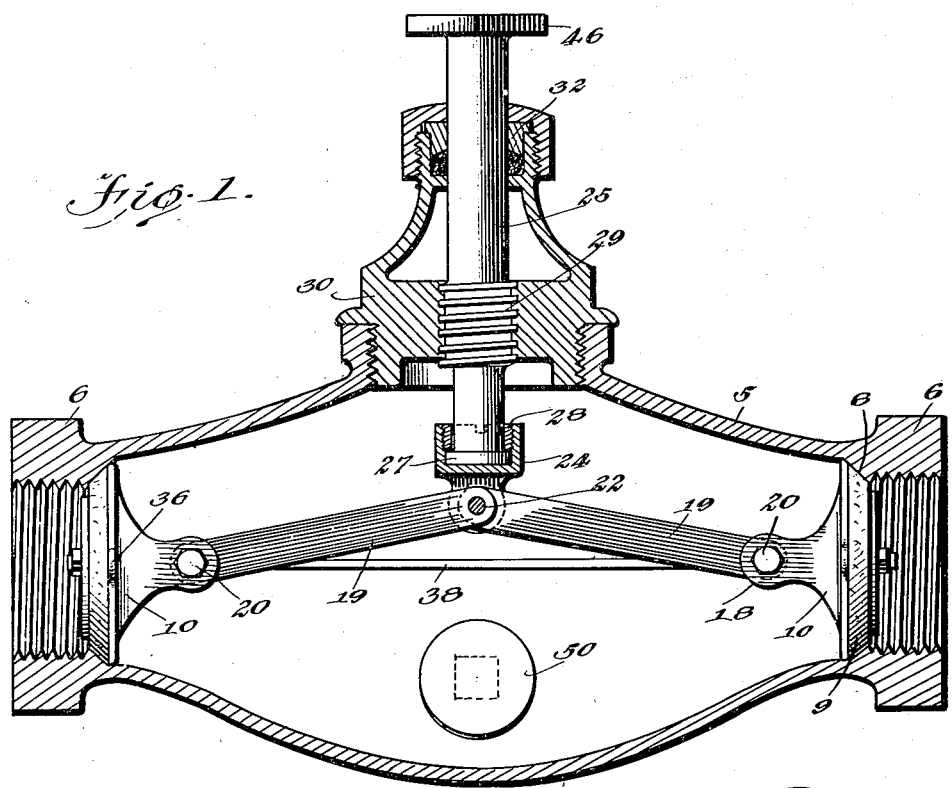

In the drawing wherein for the purpose of illustration is shown a preferred embodiment of the invention the numeral 5 designates a casing the intermediate portion of which is enlarged as illustrated in Figure 1 to provide for free passage of water. The end portions of the body 5 are provided with interiorly threaded attaching portions 6 by means of which the valve may be located in a water main. Of course the valve may be of any size and the attaching portions 6 are of a diameter to conform to the diameter of the main in which the valve is located. Also the valve seat 8 may be of rubber, brass, or other material as desired.

The interior of the casing 5 is provided inwardly of the attaching portions 6 with valve seats 8 with which annular yieldable contact members 9 of valves 10 contact to shut off the flow of water through the valve.

Figure 2:
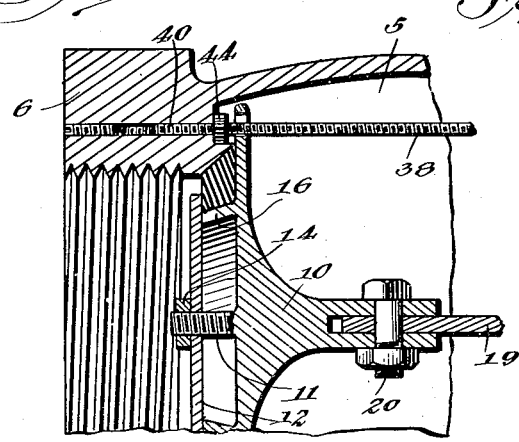
Figure 2 is a detail longitudinal sectional view illustrating the guiding means for the valve.
Figure 3:
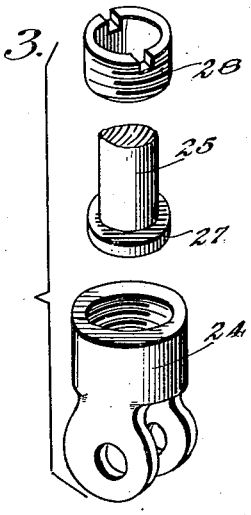
Figure 3 is a group perspective illustrating an adjusting member for the several valves.

In carrying out the invention the several valves 10 are provided with centrally arranged threads 11 which extend through disks 12 held in place by means of nuts 14. Figure 2 illustrates that the discs 12 extend beyond an annular flange 16 on the valves 10 and the discs rest upon the flange and engages the yieldable valve seat contact member 9 to hold the same in place. It will be seen that by the proper adjustment of the discs the portion 9 may be compressed and spread to compensate for wear.

The rear portions of the valves 10 are provided with apertured ears 18 to which operating links 19 are connected by means of pivot bolts 20. The inner portions of the links 19 are in turn pivotally connected as indicated at 22 to the lower portion or connecting member 24 of an adjusting stem 25.

It will be seen that the connecting member 24 is in the nature of a cup-shaped body which receives an annular flange 27 on the lower end of the stem and a sleeve nut 28 is threaded into the cup-shaped body to engage the flange 27 and thereby connect the stem to the body.

Attention is directed to the fact that the stem 25 is free to rotate with relation to the cup-shaped body 24 so that the stem may be moved up and down by means of the threaded connection 29 between the cap 30 and the stem. The cap 30 is threaded into the top of the valve casing 5 and is provided with a stuffing box 32 by means of which a water-tight connection is provided between the cap and the stem.

To guide the several valves to the seats at the opposite ends of the casing the valves are provided with oppositely directed ears 36 having transverse slots to freely receive guide rods 38. It will be seen that when the links 19 are moved longitudinally the valves 10 will move on the rods 38 and by reason of the slots in the ears 36 binding of the valves is prevented.

The end portions of the rods 38 are received in openings 40 in the end portions of the valves and the rods have threaded engagement with nuts 44 which are turned into engagement with the ends of the valve casing to hold the rods securely in position.

Figure 4:
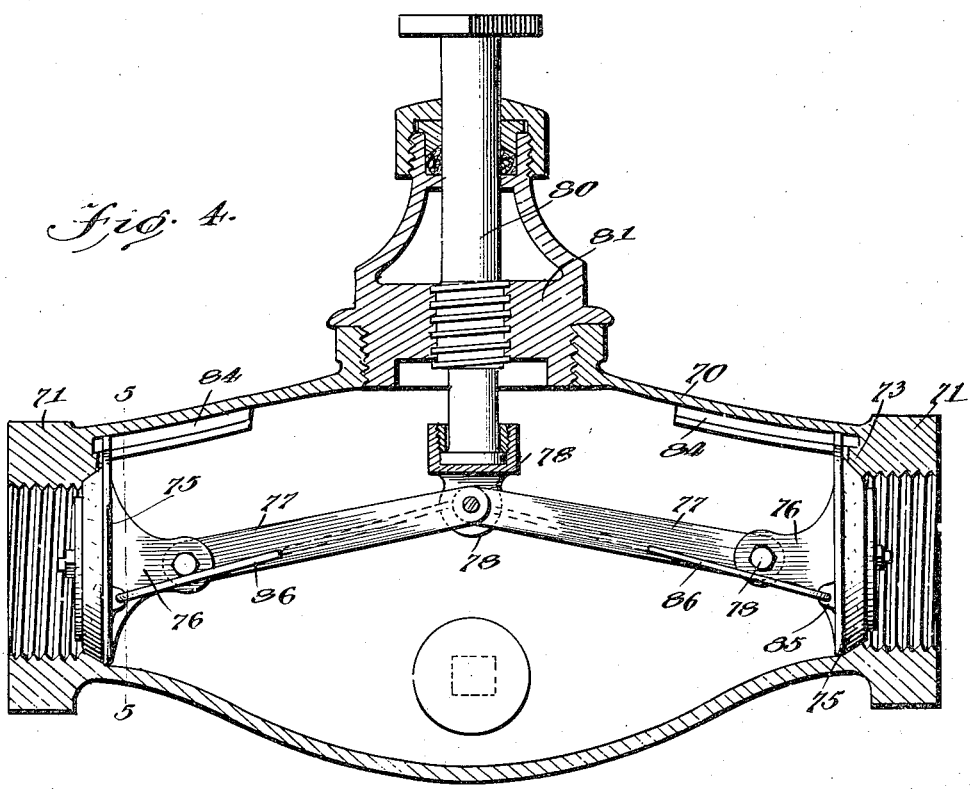
Figure 4 is a longitudinal sectional view through a modified form of the invention.
Figures 5, 6:
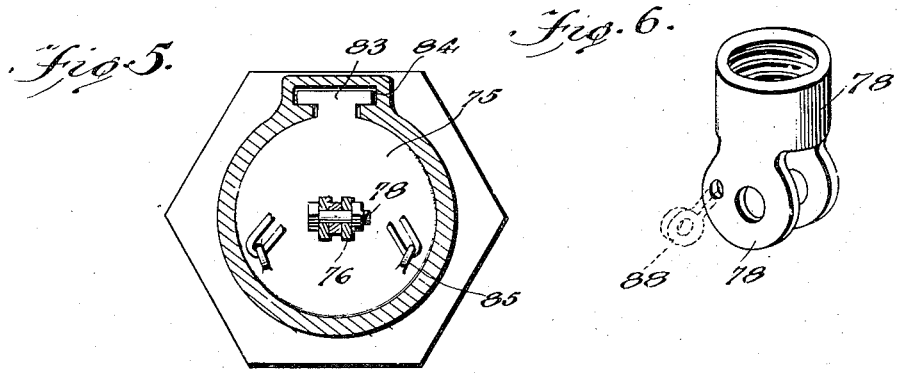
Figure 5 is a transverse sectional view on the line 5—5 of Figure 4.
Figure 6 is a perspective of a connecting member illustrated applied in Figure 4.

In the modified form of invention illustrated in Figures 4, 5 and 6 the casing is indicated by the numeral 70 and is provided at its ends with attaching members 71 of any suitable type. The casing is provided adjacent the attaching members 71 with valve seats 73 with which valves 75 of any construction may be engaged to shut off the flow of water. The inner sides of the valves 75 are provided with apertured ears 76 to which operating links 77 are pivotally connected, as indicated at 78.

The inner ends of the links 77 are pivotally connected to the ears 78 of an attaching member 79 and the attaching member is formed with a socket for the reception of the enlarged lower end of an adjusting stem 80. It will be seen that the turning of the stem 80 in the closure or cap 81 will result in the vertical movement of the stem so as to move the links 77 either in or out.

One of the important features of the invention resides in the fact that the upper portions of the valves 75 are provided with T-shaped heads 83 slidable in channel members 74 in the upper wall of the casing. It is thus seen that the valves 75 are slidably, but non-rotatably, mounted within the casing so that the same are maintained in position to engage the valve seats 73. As the links 77 are drawn inwardly and upwardly, the valves, and more particularly the T-shaped heads 83 of the same, will ride in the channel members 84 so as to maintain the valves in position to again flatly contact with the seats 73 for shutting off the flow of water or other liquid.

Also the valves are provided with pairs of rearwardly projecting ears 85 to which links 86 are connected, and the inner ends of the links are connected to eye-bolts or other apertured members 88 carried by the ears 78 so that as the valves are drawn inwardly they are swung upwardly in the direction of the top of the casing to allow of the free passage of water through the casing. In other words, the valves swing out of the way of the water or other liquid when moved inwardly. On the outward movement of the links 77 the valves will again engage the seats. It is thus seen that a dual connection is provided between the valves 75 and the operating stem 80 and by reason of this connection the several valves are positively operated.

To operate the improved valve it is merely necessary to turn the head 46 of the stem 25 by any suitable means and the links 19 will unseat the valves 10 simultaneously so that the water may freely flow through the valve. It will be seen that the pressure of the water must assist in unseating the valves and when the several valves are seated the casing 5 may be freely and conveniently cleaned of sand, gravel and other sediment by means of a clean-out member 50. The clean-out member 50 is in the nature of a plug threaded into the side of the casing and of sufficient diameter to afford free access to the interior of the casing.

A valve constructed in accordance with this invention is capable of long and efficient wear and consequently frequent replacement and interruption in the water service is unnecessary. The large amount of sand and gravel which ordinarily accumulates in valves of this type will not prevent the complete seating of the several valves and consequently the possibilities of leakage is reduced to a minimum.

The foregoing illustrates that the invention forming the subject-matter of this application is capable of a wide variety of mechanical expressions and, therefore, such minor changes in arrangement and construction of parts may be made as will remain within the spirit of the invention and the scope of what is claimed.

Having thus described the invention, what is claimed is:—

1. A valve comprising a casing having valve seats at its ends, valves co-operable with the seats, means carried by the casing and co-operable with the valves to permit the valves to slide toward and away from the valve seats while preventing rotary movement of said valves, links connected to the valves, and an operating stem connected to the links.

2. A valve comprising a casing having its end portions provided with seats, valves adapted to contact with said seats, links pivotally connected to said valves, a connecting member pivoted to the inner portions of the links, an operating stem connected to said connecting member, and a second set of links connecting the valves to the said connecting member and being joined with the valves below the centers of the same, whereby to swing the valves upwardly upon the inward movement of the links.

3. A valve comprising a casing having its end portions provided with seats, valves adapted to contact with said seats, links pivotally connected to said valves, a connecting member pivoted to the inner portions of the links, an operating stem connected to said connecting member, a second set of links connecting the valves to the connecting member and being joined with the valves below the centers of the same, whereby to swing the valves upwardly upon the inward movement of the links, and means slidably and swingingly connecting the upper portions of the valves to the casing.

4. A valve comprising a casing having valve seats, valves adapted to contact with said seats and having their upper portions formed with heads, the upper side of the casing being provided with channel members slidably receiving said heads, links connected to said valves below the horizontal centers of the same, a connecting member joined with the inner ends of said links, and a stem having connection with said connecting member.

5. A valve comprising a casing having valve seats, valves adapted to contact with said seats and having their upper portions formed with heads, the upper side of the casing being provided with channel members slidably receiving said heads, links connected to said valves below the horizontal centers of the same, a connecting member joined with the inner ends of said links, a stem having connection with said connecting member, and a second set of links connecting said valves to said connecting member.

HENRY SOUR.